United States Patent
Takemura et al.

(10) Patent No.: US 8,262,488 B2
(45) Date of Patent: Sep. 11, 2012

(54) SILICONE BOOT FOR CONSTANT VELOCITY UNIVERSAL JOINT AND CONSTANT VELOCITY UNIVERSAL JOINT

(75) Inventors: Atsuto Takemura, Iwata (JP); Yukihiro Watanabe, Iwata (JP); Mikio Tomiyama, Iwata (JP); Shintaro Harada, Iwata (JP); Keisuke Nishio, Iwata (JP)

(73) Assignee: NTN Corporation, Osaka (JP)

( * ) Notice: Subject to any disclaimer, the term of this patent is extended or adjusted under 35 U.S.C. 154(b) by 203 days.

(21) Appl. No.: 12/673,636

(22) PCT Filed: Aug. 7, 2008

(86) PCT No.: PCT/JP2008/064186
§ 371 (c)(1),
(2), (4) Date: Feb. 16, 2010

(87) PCT Pub. No.: WO2009/025184
PCT Pub. Date: Feb. 26, 2009

(65) Prior Publication Data
US 2011/0018212 A1    Jan. 27, 2011

(30) Foreign Application Priority Data
Aug. 17, 2007   (JP) ................................ 2007-213031

(51) Int. Cl.
*F16D 3/84*     (2006.01)
*F16J 15/52*    (2006.01)
(52) U.S. Cl. ........................................ 464/175; 464/905
(58) Field of Classification Search .......... 464/173–175, 464/905, 906; 403/51, 50; 277/634–636; 74/18–18.2
See application file for complete search history.

(56) References Cited

U.S. PATENT DOCUMENTS

| 3,511,061 A | 5/1970 | Burckhardt |
| 3,688,523 A * | 9/1972 | Lutz et al. .................... 464/175 |

(Continued)

FOREIGN PATENT DOCUMENTS

DE   3727871   *   3/1989   .................... 464/175

(Continued)

OTHER PUBLICATIONS

Universal Joint and Driveshaft Design Manual. Warrendale, PA; Society of Automotive Engineers, 1979. p. 131-143. T J1059.S62.*

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A silicone boot for a constant velocity universal joint includes a larger diameter portion attached to an outer joint member of a constant velocity universal joint, a smaller diameter portion attached to a shaft coupled with an inner joint member of the constant velocity universal joint, and a bellows portion, which is arranged between the larger diameter portion and the smaller diameter portion, and has peak portions and valley portions formed alternately with each other. The smaller diameter portion includes a shaft attachment portion having a radially outer surface in which a fitting groove for attachment of a boot band is formed, and a thin portion extending from the shaft attachment portion so as to be coupled with the bellows portion through intermediation of a thick portion and allowing buckling deformation with respect to the shaft attachment portion and the bellows portion.

10 Claims, 6 Drawing Sheets

U.S. PATENT DOCUMENTS

| | | | |
|---|---|---|---|
| 5,027,665 A | | 7/1991 | Hayward |
| 5,672,113 A | * | 9/1997 | Tomogami et al. ........... 464/175 |
| 6,820,876 B2 | * | 11/2004 | Iwano ........................ 464/175 |
| 2004/0116193 A1 | | 6/2004 | Toriumi et al. |
| 2006/0205523 A1 | | 9/2006 | Toriumi et al. |
| 2009/0017923 A1 | | 1/2009 | Okubo |
| 2009/0104999 A1 | | 4/2009 | Yamamoto |

FOREIGN PATENT DOCUMENTS

| | | |
|---|---|---|
| DE | 103 48 372 | 5/2004 |
| EP | 1 890 047 | 2/2008 |
| JP | 55-38010 | 3/1980 |
| JP | 63-74522 | 5/1988 |
| JP | 2553098 | 3/1989 |
| JP | 10-299788 | 11/1998 |
| JP | 10-299789 | 11/1998 |
| JP | 2004-301202 | 10/2004 |
| JP | 2004301202 * | 10/2004 |
| JP | 2007-64422 | 3/2007 |
| WO | 2006/123476 | 11/2006 |
| WO | 2007/029548 | 3/2007 |

OTHER PUBLICATIONS

Supplementary European Search Report issued Mar. 29, 2011 in corresponding European Patent Application No. 08792293.6.

International Search Report issued Oct. 21, 2008 in International (PCT) Application No. PCT/JP2008/064186.

Communication pursuant to Article 94(3) EPC issued Apr. 11, 2012 in European Application No. 08 792 293.6.

International Preliminary Report on Patentability and Written Opinion of the International Searching Authority mailed Mar. 18, 2010 in International (PCT) Application No. PCT/JP2008/064186.

* cited by examiner

SILICONE BOOT FOR CONSTANT VELOCITY UNIVERSAL JOINT AND CONSTANT VELOCITY UNIVERSAL JOINT

BACKGROUND OF THE INVENTION

I. Technical Field

The present invention relates to a silicone boot for a constant velocity universal joint and a constant velocity universal joint.

II. Description of the Related Art

For the purpose of preventing intrusion of foreign matters such as dust into the joint and leakage of grease sealed in the joint, a bellows-like boot is attached to a constant velocity universal joint used for power transmission in automobiles and various industrial machines. The following are known as a material for the boot for a constant velocity universal joint: a silicone material, a chloroprene (CR) material, an ethylene-acrylic rubber (VAMAC) material, a chlorinated polyethylene (CM) material, or the like.

As illustrated in FIG. 7, a boot of this type includes the following: a larger diameter portion 101 fixed to an outer race as an outer joint member of a constant velocity universal joint; a smaller diameter portion 102 fixed to a shaft 108 extending from an inner race as an inner joint member; and a bellows portion 105, which is provided between the larger diameter portion 101 and the smaller diameter portion 102, and has valley portions 103 and peak portions 104 formed alternately with each other. Each of the larger diameter portion 101 and the smaller diameter portion 102 is fixed through attachment of a boot band 109.

In recent years, constant velocity universal joints, in particular, constant velocity universal joints for automobiles have been used in a more severe environment owing to space saving or layout thereof near an exhaust pipe. A demand has grown for higher performance of boots for constant velocity universal joints than that in the past. A silicone material, ethylene-acrylic rubber, or chlorinated polyethylene may be adopted as a countermeasure for thermal damage. In this context, a silicone material is known as the most effective material capable of enduring both the high temperature atmosphere of 140° C. or higher and the low temperature atmosphere of −40° C. or lower (JP 2553098 B, JP 10-299788 A and JP 10-299789 A).

Incidentally, the constant velocity universal joint is provided with a function of being rotated while forming operating angles and is rotated while sliding in the axial direction. The boot for a constant velocity universal joint is deformed to follow the behavior. In accordance with the deformation, adjacent peak portions interfere with each other so as to cause abrasion, and inner surfaces of valley portions and a shaft interfere with each other so as to cause abrasion. Alternatively, a stress is repetitively generated in each of the peak portions and the valley portions so as to cause occurrence of fatigue cracks. The boot may suffer breakage as a result of progression of those. Thus, it is necessary to design the boot so as to be excellent in durability such as resistance to the abrasion and the fatigue.

The shape as illustrated in FIG. 8 is adopted as a shape of the smaller diameter portion 102 of a silicone boot. That is, in a radially outer surface of the smaller diameter portion 102, a fitting groove 110 for attachment of a boot band is provided along a circumferential direction. In the fitting groove 110, both axial end surfaces 117 and 118 each extend in a radial direction from a bottom surface 119 so as to form a right angle between the bottom surface 119. Further, between a shaft attachment portion 111 provided with the fitting groove 110 and one of the peak portions 104 on a smaller diameter side of the bellows portion 105, there is formed a relatively thick coupling portion 120. That is, a straight portion 112 is formed from a radially outer end of the axial end surface 117 on a bellows-portion side of the fitting groove 110 toward the bellows portion. The straight portion 112 and a radially outer surface of the one of the peak portions 104 of the bellows portion 105 are continuous with each other through intermediation of a round portion 113.

SUMMARY OF THE INVENTION

However, in the silicone boot as illustrated in FIG. 8, a stress is liable to concentrate between the fitting groove 110 and the one of the peak portions (first peak portion) 104 on the smaller diameter side (near round portion 113) and concentrate on a corner portion between the bottom surface 119 and the axial end surface 117 on the bellows-portion side of the fitting groove 110. Thus, cracks may occur from those portions. That is, when the constant velocity universal joint forms operating angles or slides, the peak portions and the valley portions except the first peak portion follow the movement. However, the coupling portion 120 is thick and has high rigidity, and hence is difficult to buckle at the round portion 113 and the corner portion between the axial end surface 117 and the bottom surface 119. Thus, a stress concentrates near the round portion 113 and on the corner portion between the axial end surface 117 and the bottom surface 119, which may lead to occurrence of fatigue cracks in some cases. In particular, when cracks once occur in a silicone material, the cracks immediately extend therefrom. Thus, when a silicone boot is used, it is necessary to use the silicone boot having such design that cracks do not occur therein.

In order to solve the above-mentioned problem, the present invention provides a silicone boot for a constant velocity universal joint and a constant velocity universal joint, in which occurrence of the cracks in the smaller diameter portion of the boot is suppressed and durability thereof is improved.

A silicone boot for a constant velocity universal joint according to the present invention includes the following: a larger diameter portion attached to an outer joint member of a constant velocity universal joint; a smaller diameter portion attached to a shaft coupled with an inner joint member of the constant velocity universal joint; and a bellows portion, which is arranged between the larger diameter portion and the smaller diameter portion, and has peak portions and valley portions formed alternately with each other, in which the smaller diameter portion includes: a shaft attachment portion having a radially outer surface in which a fitting groove for attachment of a boot band is formed; and a thin portion extending from the shaft attachment portion so as to be coupled with the bellows portion through intermediation of a thick portion and allowing buckling deformation with respect to the shaft attachment portion and the bellows portion.

In the silicone boot for a constant velocity universal joint according to the present invention, the thin portion is formed from the thick portion to a first peak portion on the smaller-diameter-portion side of the bellows portion, the thin portion having small rigidity. Thus, when the constant velocity universal joint forms an operating angle or slides, a slope surface on the fitting-groove side of the first peak portion is allowed to deform in a buckling manner to the bellows-portion side and the opposite bellows-portion side. Thus, it is possible to prevent concentration of stresses onto the corner portion on the bellows-portion side of the fitting groove and the corner portion on the bellows-portion side of the thin portion.

A radially outer portion on a bellows-portion side of the thin portion and a radially outer portion of the first peak portion on a smaller-diameter-portion side of the bellows portion may be continuous with each other through intermediation of a round portion. With this, it is possible to disperse the stress applied on the round portion, and hence to further prevent concentration of the stress onto the corner portion on the bellows-portion side of the thin portion.

A radially inner surface of the smaller diameter portion may include the following: a radially inner swelling portion arranged in a manner of being opposed to the fitting groove so as to fit the boot fitting portion of the shaft; and a radially inner straight portion of the thin portion. With this, even when the fitting groove is formed, the shaft attachment portion has sufficient strength. In addition, with fitting of the radially inner swelling portion to the boot fitting portion of the shaft, it is possible to effectively prevent positional shift. Further, the radially inner straight portion is held in close contact with the radially outer surface of the shaft so as to stabilize a shaft attachment state of the smaller diameter portion.

It is preferred that a circumferential groove be formed in a corner portion on a thick-portion side of the fitting groove. By the circumferential groove, it is possible to stably allow the buckling deformation when the thin portion oscillates with respect to the shaft attachment portion, and hence to prevent excessive load application onto the corner portion.

The constant velocity universal joint according to the present invention may include the following: a plunging type constant velocity universal joint, and is adapted to allow a displacement in an axial direction and a change in operating angle; and a fixed type constant velocity universal joint, which is adapted to allow only the change in operating angle. That is, the present invention is applicable to constant velocity universal joints of any type, such as one capable of forming high operating angles (for example, a fixed type constant velocity universal joint such as a Rzeppa joint and a Birfield joint), and one provided with a mechanism for sliding in an axial direction of the outer joint member (for example, a plunging type constant velocity universal joint such as a double offset joint, a tripod joint, and a cross-groove joint).

According to the present invention, it is possible to prevent the concentration of stresses onto the corner portion on the bellows-portion side of the fitting groove and the corner portion on the bellows-portion side of the thin portion, and hence to suppress occurrence of cracks from those portions. Thus, durability of the boot can be improved. With this, it is possible to prevent intrusion of dust and the like into the joint and leakage of grease sealed in the joint over a long period of time, and hence to provide a boot which stably operates.

The round portion is formed at the corner portion on the bellows-portion side of the thin portion. With this, it is possible to disperse the stress applied to the round portion, and hence to further prevent concentration of the stress onto this part.

The shaft attachment portion has sufficient strength. In addition, with fitting of the radially inner swelling portion to the boot fitting portion of the shaft, it is possible to effectively prevent positional shift. Further, the radially inner straight portion is held in close contact with the radially outer surface of the shaft so as to stabilize a shaft attachment state of the smaller diameter portion. That is, the shaft attachment state of the smaller diameter portion is stabilized over a long period of time, and hence the boot is capable of effectively exerting a function as a boot.

By the circumferential groove of the corner portion on the thick-portion side of the fitting groove, it is possible to prevent excessive load application onto the corner portion. As a result, durability can be further improved.

The boot of the present invention is applicable to constant velocity universal joint of any type. Thus, it is possible to constitute a constant velocity universal joint which is excellent in durability and to which a silicone boot for a constant velocity universal joint is attached, the boot being excellent in fatigue resistance. It is particularly preferred that the boot of the present invention be applied to a plunging type constant velocity universal joint used on a side of a differential gear used for a drive shaft for an automobile. This is because the constant velocity universal joint is frequently exposed to high temperature atmosphere.

DETAILED DESCRIPTION OF THE INVENTION

In the following, description is made of the embodiment of the present invention with reference to FIGS. 1 to 6.

Figure 1:
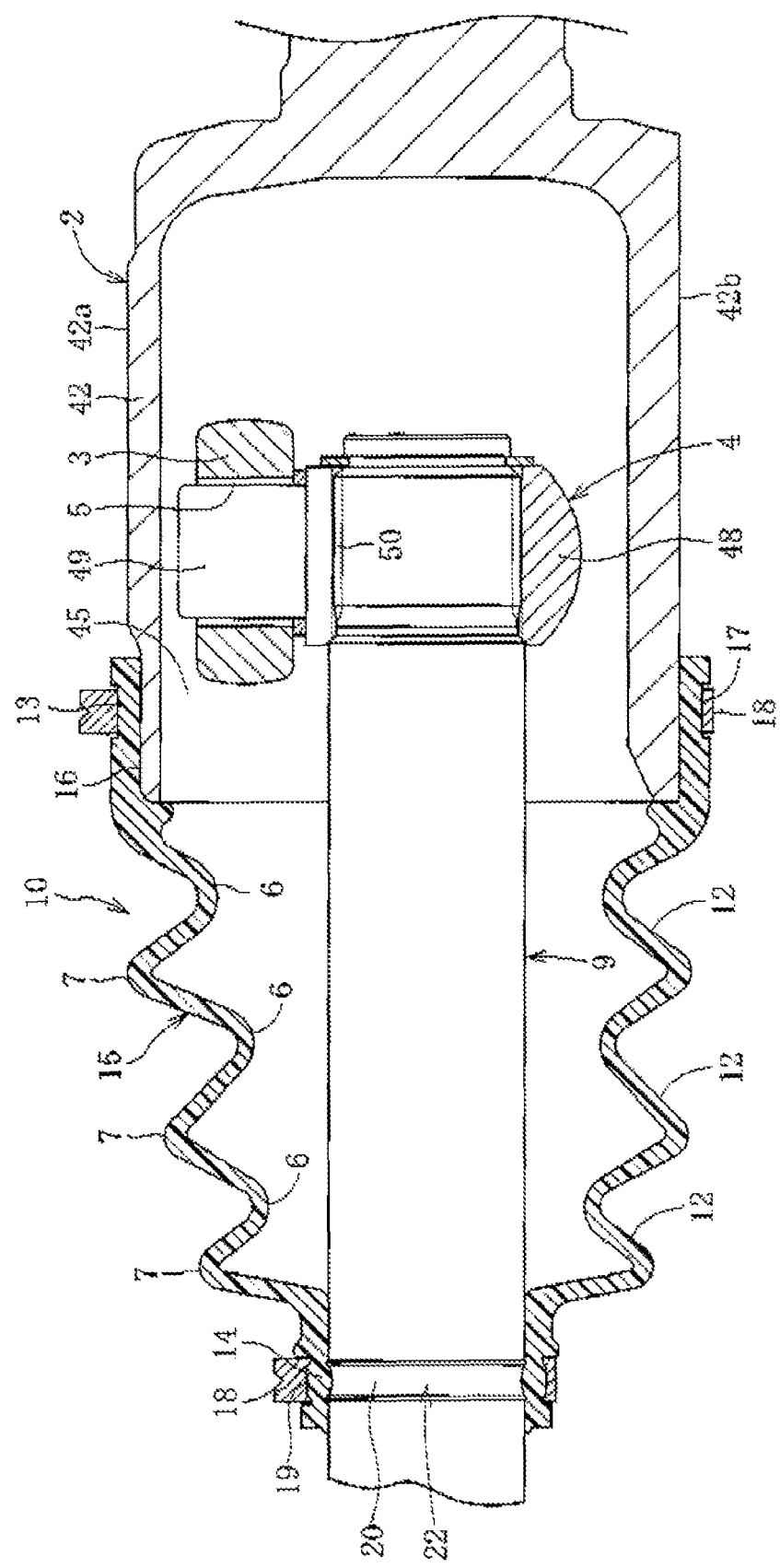
FIG. 1 is a sectional view of a constant velocity universal joint in which a silicone boot for a constant velocity universal joint according to the embodiment of the present invention is used.

As illustrated in FIG. 1, a boot 10 for a constant velocity universal joint according to the present invention is attached to a constant velocity universal joint. The constant velocity universal joint in this case is a tripod type constant velocity universal joint, and includes the following as main components: an outer joint member 2, a tripod member 4 as an inner joint member, and rollers 3 as a torque transmitting member.

Figure 2:
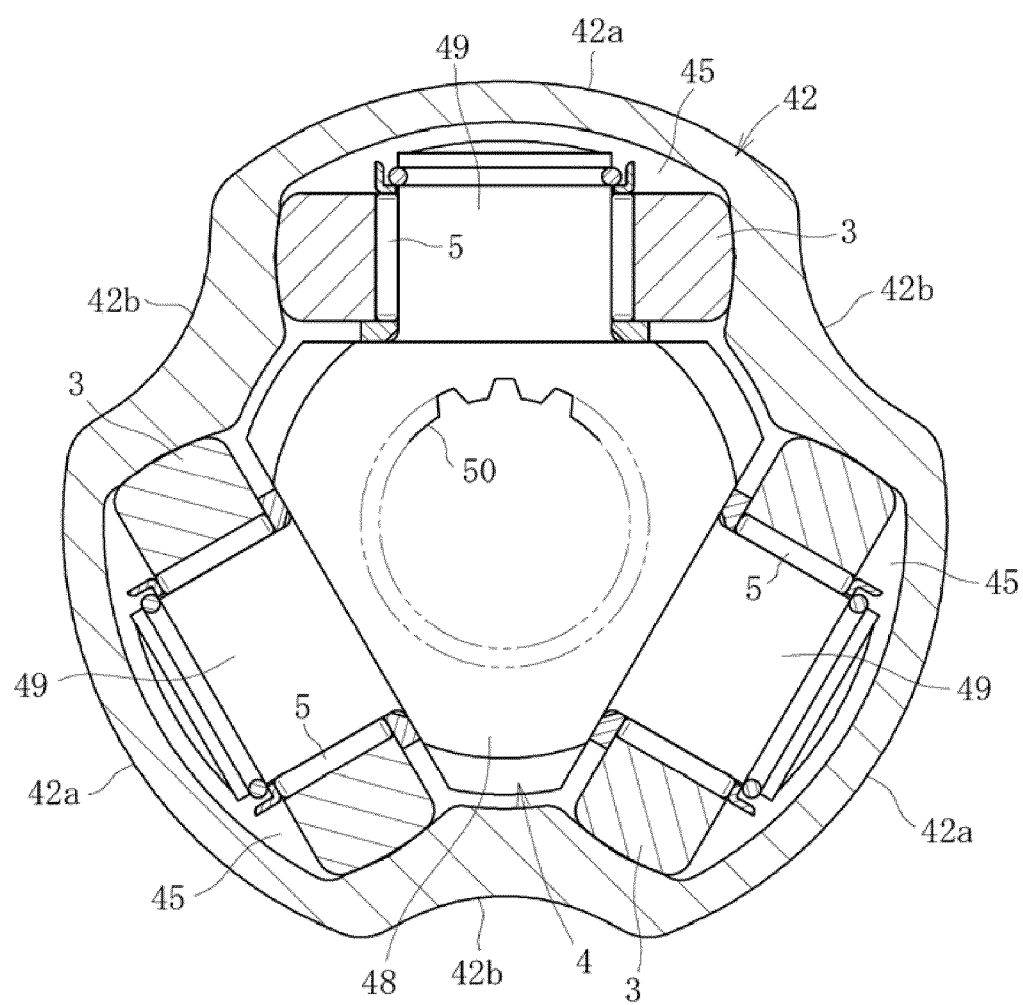
FIG. 2 is an enlarged lateral sectional view of the constant velocity universal joint.

The outer joint member 2 is constituted by a mouth portion 42 and a stem portion (not shown) which are formed integrally with each other. The mouth portion 42 has a shape of a cup opening on an opposite stem-portion side, and as illustrated in FIG. 2, has a non-cylindrical shape in which larger diameter portions 42a and smaller diameter portions 42b alternately appear on an outer peripheral surface thereof. That is, with the larger diameter portions 42a and the smaller diameter portions 42b thus formed, there are formed track grooves 45 arranged at a pitch of 120 degrees along a circumferential direction in the mouth portion 42.

The tripod member 4 is constituted by a boss 48 and leg shafts 49. In the boss 48, there is formed a spline or a serration hole 50 which is coupled with a shaft 9 so as to transmit torque. The leg shafts 49 protrude from three equiangular positions of the boss 48 in a radial direction. The leg shafts 49 of the tripod member 4 support the rollers 3, respectively. A plurality of needle rollers 5 are interposed between the leg shafts 49 and the rollers 3, the rollers 3 being rotatable about axial lines of the leg shafts 49. Note that, snap rings, washers, and the like for preventing the rollers 3 from falling out are omitted in FIG. 1. Further, there is illustrated herein a constant velocity universal joint of a single roller type in which the leg shafts 49 each support one roller 3. Alternatively, it is possible to use a constant velocity universal joint of a double roller type in which the leg shafts 49 each support relatively-rotatable inner-and-outer rollers.

Figure 3:
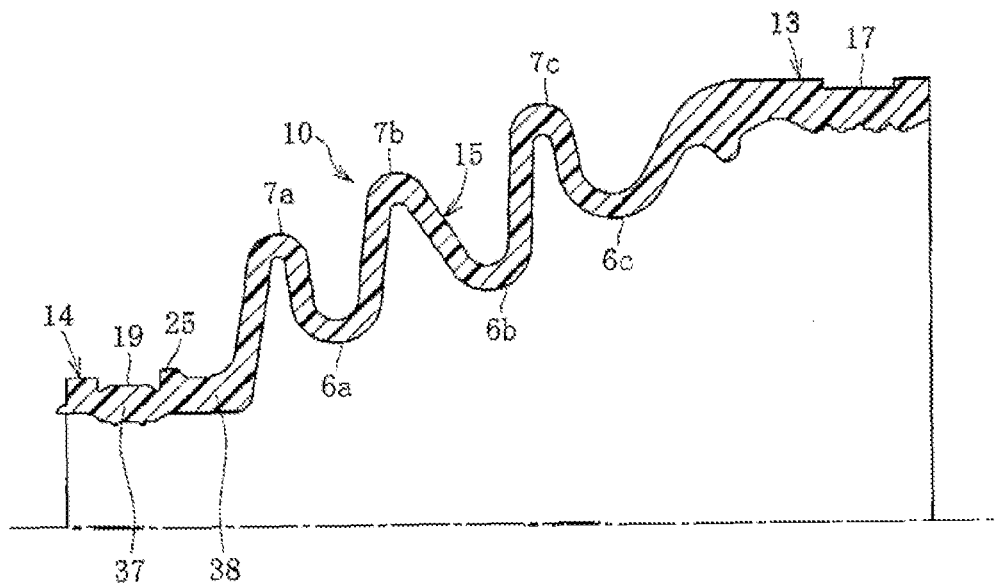
FIG. 3 is a sectional view of the silicone boot for a constant velocity universal joint according to the present invention.

As illustrated in FIG. 3, the boot 10 for a constant velocity universal joint includes the following: a larger diameter portion 13 attached to an opening end portion of the outer joint member 2 of the constant velocity universal joint; a smaller diameter portion 14 attached to the shaft 9 coupled with the inner joint member 4 of the constant velocity universal joint; and a bellows portion 15, which is arranged between the larger diameter portion 13 and the smaller diameter portion 14, and has peak portions 7 and valley portions 6 formed alternately with each other in an axial direction. The peak portions 7 and the valley portions 6 are coupled with each other through intermediation of inclined portions 12. Note that, a closest one of the peak portions 7 with respect to the smaller diameter portion is referred to as a first peak portion 7a, and the others of the peak portions 7 are referred to as a second peak portion 7b and a third peak portion 7c in the order toward a larger diameter portion. Further, a closest one of the valley portions 6 with respect to the smaller diameter portion is referred to as a first valley portion 6a, and the others of the valley portions 6 are referred to as a second valley portion 6b and a third valley portion 6c in the order toward the larger diameter portion.

Figure 4:
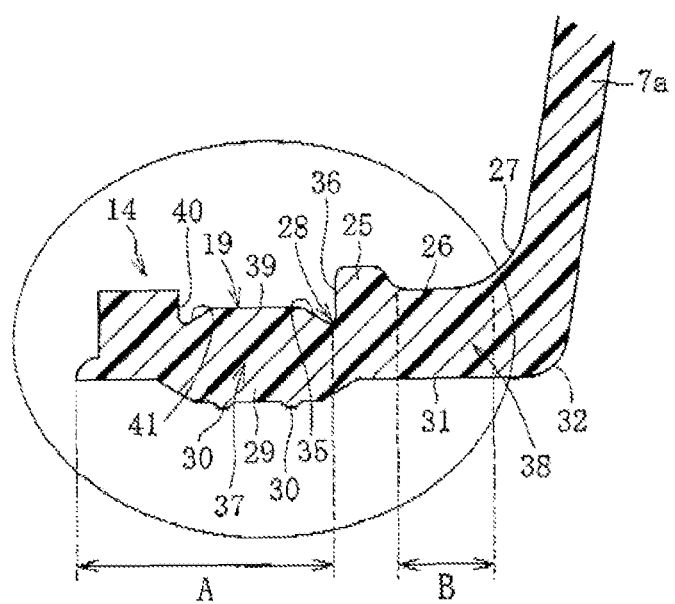
FIG. 4 is an enlarged sectional view of a main part of the silicone boot for a constant velocity universal joint according to the present invention.

As illustrated in FIG. 4, the smaller diameter portion 14 includes a shaft attachment portion 37 having a radially outer surface in which a fitting groove 19 for attachment of a boot band is formed, and a thin portion 38 extending from the shaft attachment portion 37 and coupled with the bellows portion 15 through intermediation of a thick portion 25. The thin portion 38 is constituted by a recess formed in a radially outer surface of the smaller diameter portion 14. A radially outer portion on the bellows-portion side of the thin portion 38 and a radially outer portion of the first peak portion 7a on a smaller-diameter-portion side of the bellows portion 15 are continuous with each other through intermediation of a round portion 27. A radially outer surface of the thin portion 38 has a radially outer straight portion 26. Further, the thick portion 25 swelling in a radially outer direction is provided between the radially outer straight portion 26 and the fitting groove 19. As shown, in FIGS. 1 and 4, the thick portion 25 has a diameter larger than each other portion of the small diameter portion. A thickness dimension of the thin portion 38 is set to be larger than a thickness dimension (thickness) of the bellows portion 15. That is, the thin portion 38 has higher rigidity than that of the bellows portion 15.

Further, a circumferential groove 35 is provided in a corner portion 28 on the thick-portion side of the fitting groove 19. That is, the circumferential groove 35 is constituted by a tapered wall 35 reduced in diameter from an end portion on the bellows-portion side of a bottom surface 39 of the fitting groove 19 toward the bellows portion and a radial wall 36 on the thick-portion side of the fitting groove 19. Further, on an opposite bellows-portion side of the fitting groove 19, there is formed a circumferential groove 41 constituted by a radial wall 40 and a tapered wall increasing in diameter from a radially inner end of the radial wall 40 toward the bellows portion.

On a radially inner surface of the smaller diameter portion 14 of the boot, there are provided, at parts opposed to the fitting groove 19, a radially inner swelling portion 29 having a trapezoidal shape in cross-section and a radially inner straight portion 31 opposed to the thick portion 25 and the straight portion 26. In this context, the radially inner straight portion 31 and the radially inner surface of the first peak portion 7a are continuous with each other through intermediation of a radially inner round portion 32. Further, on the radially inner swelling portion 29, there are provided two protruding portions 30 along an axial direction.

The boot 10 for a constant velocity universal joint is formed of a silicone. The silicone is a generic term for polymeric organic compounds (polymers) each having a siloxane-bond skeleton. The silicone is colorless and odorless and has water repellency, and is provided as a product in a form of grease, wax, oil, rubber (elastomer), gel, or the like based on a difference in degree of polymerization and the like. In any form, the silicone exhibits oil resistance, oxidation resistance, and thermal resistance higher than those of a polymer having a corresponding carbon skeleton, and is nonconductive.

A boot attachment portion 16 is provided on the outer peripheral surface on the opening-portion side of the outer joint member 2, and the larger diameter portion 13 is fitted to an outside of the boot attachment portion 16. Then, by attaching a boot band 18 in a fitting manner to a fitting groove 17 formed in the outer peripheral surface of the larger diameter portion 13 of the boot 10, the larger diameter portion 13 is fixed to the outer joint member 2.

In the shaft 9, a boot fitting portion 22 having a boot fitting groove 20 formed along the circumferential direction is provided while protruding from the outer joint member 2 by a predetermined amount, and the smaller diameter portion 14 is fitted to an outside of the boot fitting portion 22. Then, by attaching the boot band 18 in a fitting manner to the fitting groove 19 formed in the outer peripheral surface of the smaller diameter portion 14 of the boot 10, the smaller diameter portion 14 is fixed to the shaft 9.

As described above, in the silicone boot for a constant velocity universal joint according to the present invention, the thin portion 38 is formed from the thick portion 25 to the first peak portion 7a on the smaller-diameter-portion side of the bellows portion 15, the thin portion 38 having small rigidity. Thus, when the constant velocity universal joint forms an operating angle or slides, a slope surface on the fitting-groove side of the first peak portion 7a is allowed to deform in a buckling manner to the bellows-portion side and the opposite bellows-portion side. That is, it is possible to prevent concentration of stresses onto the corner portion on the bellows-portion side of the fitting groove 19 and the corner portion on the bellows-portion side of the thin portion 38, and to suppress occurrence of cracks in those portions. Thus, durability of the boot can be improved. With this, it is possible to prevent intrusion of dust and the like into the joint and leakage of grease sealed in the joint over a long period of time, and hence to provide a boot which stably operates.

The outer diameter portion on the bellows-portion side of the thin portion 38 and the outer diameter portion of the first peak portion 7a on the smaller-diameter-portion side of the bellows portion 15 are continuous with each other through intermediation of the round portion 27. With this, it is possible to disperse the stress applied to the round portion 27, and hence to further prevent concentration of the stress onto the corner portion on the bellows-portion side of the thin portion 38.

The radially inner surface of the smaller diameter portion 14 is provided with the radially inner swelling portion 29 arranged in a manner of being opposed to the fitting groove 19 so as to fit the boot fitting portion 22 of the shaft 9 and the radially inner straight portion 31 of the thin portion. With this, even when the fitting groove 19 is formed, the shaft attachment portion 37 has sufficient strength. In addition, with fitting of the radially inner swelling portion 29 to the boot fitting portion 22 of the shaft 9, it is possible to effectively prevent positional shift. Further, the radially inner straight portion 31 is held in close contact with the radially outer surface of the shaft 9 so as to stabilize a shaft attachment state of the smaller diameter portion 14. That is, the shaft attachment state of the smaller diameter portion 14 is stabilized over a long period of time, and hence the boot is capable of effectively exerting a function as a boot.

The circumferential groove 35 is formed at the corner portion 28 on the thick-portion side of the fitting groove 19. By the circumferential groove 35, it is possible to prevent excessive load application onto the corner portion 28 when the thin portion 38 oscillates with respect to the shaft attachment portion 37. As a result, durability can be further improved.

There may be given constant velocity universal joints to which the boot of the present invention is applicable, such as one capable of forming operating angles (for example, a ball-fixed constant velocity universal joint such as a Rzeppa joint and a Birfield joint), and one provided with a mechanism for sliding in an axial direction of the outer joint member while being incapable of forming sufficiently high operating angles (for example, a plunging type constant velocity universal joint such as a double offset joint, a tripod joint, and a cross-groove joint). As described above, the boot of the present invention is applicable to those various constant velocity universal joints. With this, it is possible to constitute a constant velocity universal joint which is excellent in durability and to which a silicone boot for a constant velocity universal joint is attached, the boot being excellent in fatigue resistance.

It is particularly preferred that the boot of the present invention be applied to a plunging type constant velocity universal joint used on a side of a differential gear used for a drive shaft for an automobile. This is because the constant velocity universal joint is frequently exposed to high temperature atmosphere.

Hereinabove, although description has been made of the embodiment of the present invention, the present invention is not limited to the above description in the embodiment, and various modifications may be made thereto. For example, while being formed in a straight shape in the embodiment, the radially outer surface of the thin portion 38 may be recessed on the radially inner side so as to exhibits a round shape. Further, it is possible to arbitrarily set axial dimensions and radial dimensions of the thick portion 25 and the radially outer straight portion 26. Still further, it is also possible to omit the circumferential groove on the opposite bellows-portion side of the fitting groove 19. In addition, the numbers of the peak portions 7 and the valley portions 6 of the bellows portion 15 are not limited those described above in the embodiment, and the entire length of the boot 10 may be changed.

EXAMPLE

Figure 7:
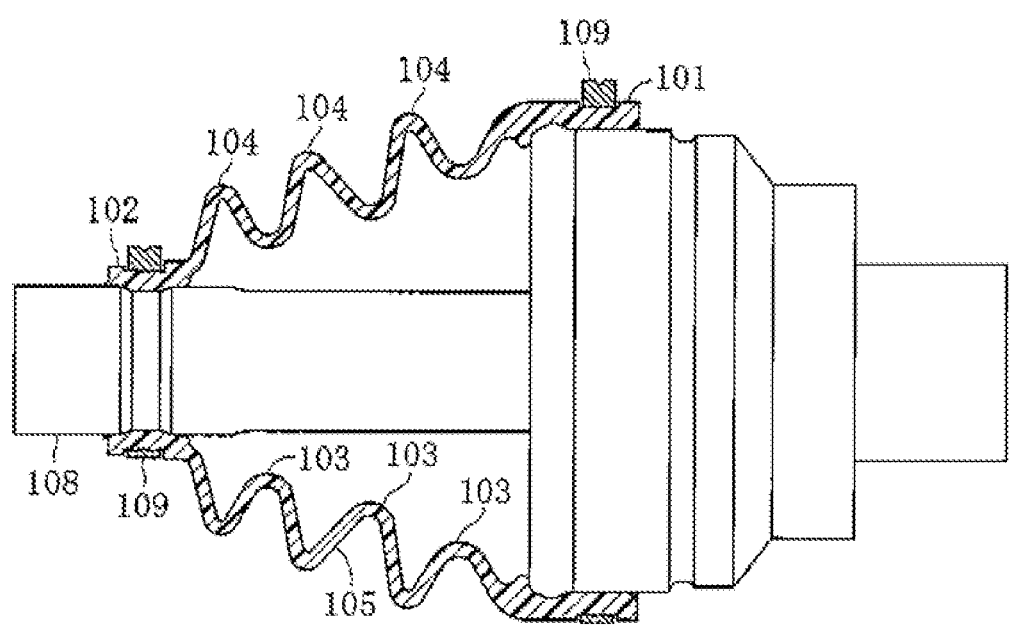
FIG. 7 is a sectional view of a state in which the conventional silicone boot for a constant velocity universal joint is used.
Figure 8:
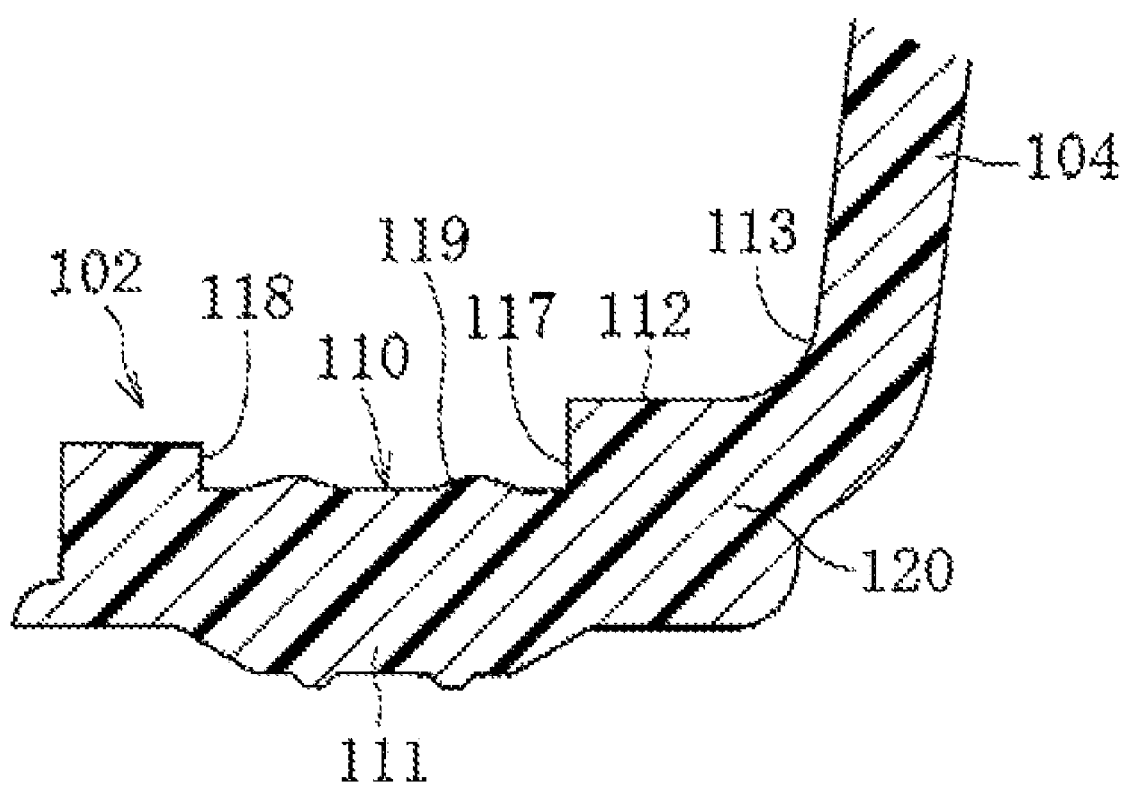
FIG. 8 is an enlarged sectional view of a main part of the conventional silicone boot for a constant velocity universal joint.

There were prepared an invention of the silicone boot for a constant velocity universal joint and a comparative product of the silicone boot for a constant velocity universal joint, and an oscillation durability test was performed thereon. The test was performed under the same condition on the invention and the comparative product. That is, the invention and the comparative product were left for 50 hours at 100° C., and then subjected to oscillating rotation performed under the following condition: a rotational speed of 600 rpm, a cycling frequency of 30 cpm, and 200 hours at normal temperature. The invention is a silicone boot for a constant velocity universal joint, in which the smaller diameter portion has the shape as that in the present invention, that is, the shape as illustrated in FIGS. 1, 3, and 4. The comparative product is a silicone boot for a constant velocity universal joint, in which the smaller diameter portion has the shape as that in conventional examples, that is, the shape as illustrated in FIGS. 7 and 8.

Then, an observation of existence of cracks was made on a corner portion on a bellows-portion side of a fitting groove and a round portion of a radially outer surface of a smaller diameter portion.

Figure 5A:
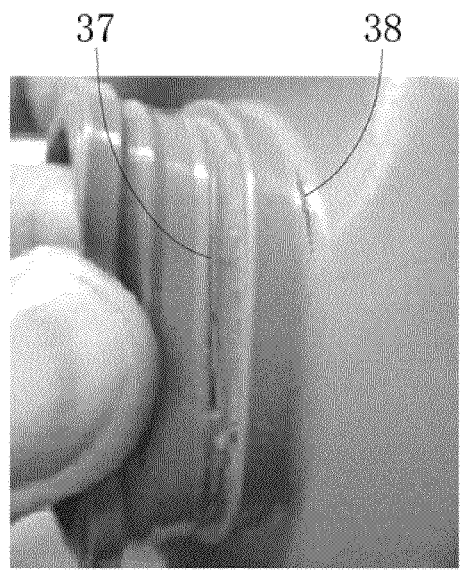
FIG. 5A is a perspective view of a conventional silicone boot for a constant velocity universal joint after an oscillation durability test performed at normal temperature, the boot being used as a comparative product.
Figure 5B:
FIG. 5B is a perspective view of a silicone boot for a constant velocity universal joint according to the present invention after an oscillation durability test performed at normal temperature, the invention being used as an invention.

As illustrated in FIG. 5A, existence of a crack 37 was confirmed along a circumferential direction in the corner portion on the bellows-portion side of the fitting groove of the comparative product. Further, existence of a crack 38 was confirmed along the circumferential direction also in the round portion of the smaller diameter portion. Meanwhile, as illustrated in FIG. 5B, existence of cracks was confirmed in the corner portion on the bellows-portion side of the fitting groove or in the round portion of the smaller diameter portion. Those results proved that, under the same condition, occurrence of cracks in the corner portion on the bellows-portion side of the fitting groove and in the round portion of the smaller diameter portion was suppressed more in the invention than in the comparative product.

Figure 6:
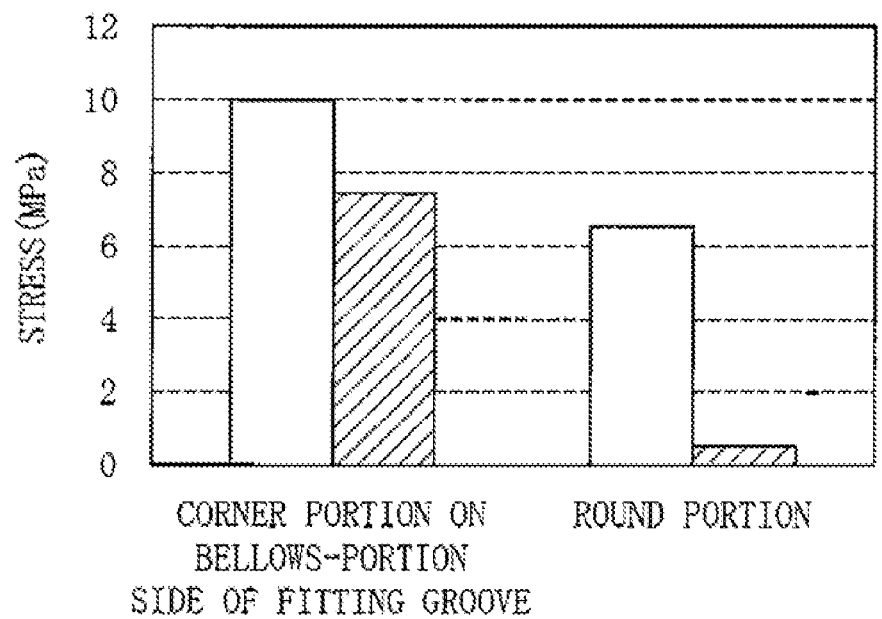
FIG. 6 is a graph showing FEM analysis results of the silicone boot for a constant velocity universal joint according to the present invention and the conventional silicone boot for a constant velocity universal joint.

FIG. 6 shows finite element method (FEM) analysis results of the invention and the comparative product. In FIG. 6, blank portions indicate analysis results of the comparative product and hatched portions indicate analysis results of the invention. That is, FIG. 6 shows the following: a stress of approximately 10 MPa was applied on the corner portion on the bellows-portion side of the fitting groove of the comparative product and a stress of approximately 7.5 MPa was applied on that of the invention; and a stress of approximately 6.5 MPa was applied on the round portion of the comparative product and a stress of approximately 0.5 MPa was applied on that of the invention. Those results proved that, stresses applied to any portions of the corner portion on the bellows-portion side of the fitting groove and in the round portion were reduced more in the invention than in the comparative product.

The present invention can be used in various parts in a constant velocity universal joint for power transmission in automobiles and various industrial machines.

The invention claimed is:

1. A silicone boot for a constant velocity universal joint, comprising:
    a larger diameter portion configured to be attached to an outer joint member of a constant velocity universal joint;
    a smaller diameter portion configured to be attached to a shaft coupled with an inner joint member of the constant velocity universal joint; and
    a bellows portion, said bellows portion being arranged between said larger diameter portion and said smaller diameter portion, and having peak portions and valley portions formed alternately with each other, wherein said smaller diameter portion comprises
a shaft attachment portion having a radially outer surface with a fitting groove for attachment of a boot band, and
a thin portion extending from said shaft attachment portion so as to be coupled with the bellows portion through intermediation of a thick portion and configured to allow buckling deformation with respect to said shaft attachment portion and said bellows portion, and
wherein a circumferential groove is disposed in a corner portion on a side of said thick portion, and
said thick portion has a larger diameter than each other portion of said smaller diameter portion.

2. A silicone boot for a constant velocity universal joint according to claim 1, wherein a radially outer portion on a bellows-portion side of said thin portion and a radially outer portion of a first peak portion on a smaller-diameter-portion side of said bellows portion are continuous with each other through intermediation of a round portion.

3. A silicone boot for a constant velocity universal joint according to claim 2, wherein a radially inner surface of said smaller diameter portion comprises:
a radially inner swelling portion arranged so as to be opposed to said fitting groove so as to fit a boot fitting portion of the shaft; and
a radially inner straight portion of said thin portion.

4. A constant velocity universal joint, which is a plunging type constant velocity universal joint, and is configured to enable a displacement in an axial direction and a change in operating angle, wherein the silicone boot for a constant velocity universal joint according to claim 2 is attached thereto.

5. A constant velocity universal joint, which is a fixed type constant velocity universal joint, and is configured to enable only a change in operating angle, wherein the silicone boot for a constant velocity universal joint according to claim 2 is attached thereto.

6. A silicone boot for a constant velocity universal joint according to claim 1, wherein a radially inner surface of said smaller diameter portion comprises:
a radially inner swelling portion arranged so as to be opposed to said fitting groove so as to fit a boot fitting portion of the shaft; and
a radially inner straight portion of said thin portion.

7. A constant velocity universal joint, which is a plunging type constant velocity universal joint, and is configured to enable a displacement in an axial direction and a change in operating angle, wherein the silicone boot for a constant velocity universal joint according to claim 6 is attached thereto.

8. A constant velocity universal joint, which is a fixed type constant velocity universal joint, and is configured to enable only a change in operating angle, wherein the silicone boot for a constant velocity universal joint according to claim 6 is attached thereto.

9. A constant velocity universal joint, which is a plunging type constant velocity universal joint, and is configured to enable displacement in an axial direction and a change in operating angle, wherein the silicone boot for a constant velocity universal joint according to claim 1 is attached thereto.

10. A constant velocity universal joint, which is a fixed type constant velocity universal joint, and is configured to enable only a change in operating angle, wherein the silicone boot for a constant velocity universal joint according to claim 1 is attached thereto.

* * * * *